United States Patent
Cloran et al.

(10) Patent No.: US 8,223,944 B2
(45) Date of Patent: Jul. 17, 2012

(54) CONFERENCE CALL MANAGEMENT SYSTEM

(75) Inventors: Michael Eric Cloran, Indianapolis, IN (US); Mitchell Gregory Shields, Noblesville, IN (US); Theron Justin Lamm, Indianapolis, IN (US); Jeromey Russell Goetz, Kent, WA (US); David Paul Heitzman, Newtown, PA (US); Jason Aaron Kolb, Zionsville, IN (US)

(73) Assignee: Interactions Corporation, Carmel, IN (US)

( * ) Notice: Subject to any disclaimer, the term of this patent is extended or adjusted under 35 U.S.C. 154(b) by 347 days.

(21) Appl. No.: 12/618,743

(22) Filed: Nov. 15, 2009

(65) Prior Publication Data

US 2010/0061539 A1    Mar. 11, 2010

Related U.S. Application Data

(63) Continuation-in-part of application No. 12/551,864, filed on Sep. 1, 2009, which is a continuation of application No. 10/839,536, filed on May 5, 2004, now Pat. No. 7,606,718.

(60) Provisional application No. 61/121,041, filed on Dec. 9, 2008, provisional application No. 60/467,935, filed on May 5, 2003.

(51) Int. Cl.
  *H04M 3/42* (2006.01)
(52) U.S. Cl. ......... 379/202.01; 379/203.01; 379/204.01; 379/205.01
(58) Field of Classification Search . 379/202.01–205.01
See application file for complete search history.

(56) References Cited

U.S. PATENT DOCUMENTS

| | | | |
|---|---|---|---|
| 5,033,088 A | | 7/1991 | Shipman |
| 5,199,062 A | | 3/1993 | Von Meister et al. |
| 5,483,588 A | * | 1/1996 | Eaton et al. ............. 379/202.01 |
| 5,740,240 A | | 4/1998 | Jolissaint |
| 5,822,727 A | * | 10/1998 | Garberg et al. ............ 704/270.1 |
| 5,884,032 A | | 3/1999 | Bateman et al. |
| 5,987,116 A | | 11/1999 | Petrunka et al. |
| 6,038,293 A | | 3/2000 | McNerney et al. |
| 6,058,435 A | | 5/2000 | Sassin et al. |
| 6,292,830 B1 | | 9/2001 | Taylor et al. |
| 6,311,231 B1 | | 10/2001 | Bateman et al. |
| 6,314,176 B1 | | 11/2001 | Gunasekar |

(Continued)

FOREIGN PATENT DOCUMENTS

WO    02060161    8/2002

(Continued)

OTHER PUBLICATIONS

Coombs, Art, "Call Center Site Selection Methodology." Teleprofessional International, pp. 41-45 (Sep./Oct. 1996).

(Continued)

*Primary Examiner* — Ahmad Matar
*Assistant Examiner* — Nafiz E Hoque
(74) *Attorney, Agent, or Firm* — Fenwick & West LLP

(57) ABSTRACT

Systems and methods are described for improving connection to and management of conference calls. An inference/rules engine and human backed speech interpretation subsystem enable the system to efficiently use knowledge about the call to identify the caller and determine to which conference he or she should be connected. During the conference, a virtual assistant is available to interpret and execute system commands spoken by a caller, such as in a side conference accessed via DTMF tones.

4 Claims, 11 Drawing Sheets

U.S. PATENT DOCUMENTS

| | | | |
|---|---|---|---|
| 6,366,658 B1 | 4/2002 | Bjornberg et al. | |
| 6,370,508 B2 | 4/2002 | Beck et al. | |
| 6,401,061 B1 | 6/2002 | Zieman | |
| 6,411,686 B1 | 6/2002 | Porter et al. | |
| 6,442,247 B1 | 8/2002 | Garcia | |
| 6,473,505 B1 | 10/2002 | Khuc et al. | |
| 6,499,013 B1 | 12/2002 | Weber | |
| 6,587,558 B2 | 7/2003 | Lo | |
| 6,668,286 B2 | 12/2003 | Bateman et al. | |
| 6,721,416 B1 | 4/2004 | Farrell | |
| 6,831,966 B1 | 12/2004 | Tegan et al. | |
| 6,922,466 B1 | 7/2005 | Peterson et al. | |
| 6,925,167 B2 | 8/2005 | Suder et al. | |
| 7,292,689 B2 | 11/2007 | Odinak et al. | |
| 7,466,812 B1 * | 12/2008 | Mahy et al. | 379/202.01 |
| 7,487,095 B2 | 2/2009 | Hill et al. | |
| 7,606,714 B2 | 10/2009 | Williams et al. | |
| 2001/0011366 A1 | 8/2001 | Beck et al. | |
| 2001/0044676 A1 | 11/2001 | Macleod Beck et al. | |
| 2002/0032591 A1 * | 3/2002 | Mahaffy et al. | 705/8 |
| 2002/0152071 A1 | 10/2002 | Chaiken et al. | |
| 2002/0154757 A1 | 10/2002 | Hack | |
| 2003/0002651 A1 | 1/2003 | Shires | |
| 2003/0007612 A1 | 1/2003 | Garcia | |
| 2003/0046101 A1 | 3/2003 | Dow | |
| 2003/0046102 A1 | 3/2003 | Dow | |
| 2003/0108183 A1 | 6/2003 | Dhir et al. | |
| 2003/0177009 A1 | 9/2003 | Odinak et al. | |
| 2003/0179876 A1 | 9/2003 | Fox et al. | |
| 2003/0185380 A1 | 10/2003 | Garin | |
| 2003/0187988 A1 | 10/2003 | Lee et al. | |
| 2003/0212558 A1 | 11/2003 | Matula | |
| 2003/0215066 A1 | 11/2003 | Shambaugh et al. | |
| 2004/0059841 A1 | 3/2004 | Bateman et al. | |
| 2004/0162724 A1 | 8/2004 | Hill et al. | |
| 2005/0163304 A1 | 7/2005 | Judkins et al. | |
| 2005/0177368 A1 | 8/2005 | Odinak et al. | |
| 2005/0259803 A1 * | 11/2005 | Khartabil | 379/202.01 |
| 2007/0276908 A1 * | 11/2007 | Asthana et al. | 709/204 |
| 2007/0286359 A1 | 12/2007 | Odinak et al. | |
| 2008/0056460 A1 | 3/2008 | Odinak et al. | |
| 2009/0052646 A1 * | 2/2009 | McGowan et al. | 379/202.01 |

FOREIGN PATENT DOCUMENTS

| | | |
|---|---|---|
| WO | 03009175 A1 | 1/2003 |

OTHER PUBLICATIONS

Coombs, Arthur, "The Staffing Challenge." Teleprofessional International, pp. 24-26 (Jan./Feb. 1997).

Australian Patent Office, Examiner's First Report, Australian Patent Application No. 2004-237227, Nov. 6, 2009, two pages.

Australian Patent Office, Examiner's Second Report, Australian Patent Application No. 2004-237227, Sep. 9, 2010, two pages.

European Patent Office, Examination Report, European Patent Application No. EP 04751363.5, May 18, 2005, six pages.

Indian Patent Office, Examination Report, Indian Patent Application No. 2875/CHENP/2005, Jun. 16, 2009, two pages.

Indian Patent Office, First Examination Report, Indian Patent Application No. 2875/CHENP/2005, Jun. 18, 2008, two pages.

New Zealand Intellectual Property Office, Examination Report, New Zealand Patent Application No. 543885, Oct. 3, 2008, two pages.

New Zealand Intellectual Property Office, Examination Report, New Zealand Patent Application No. 543885, Apr. 30, 2009, two pages.

* cited by examiner

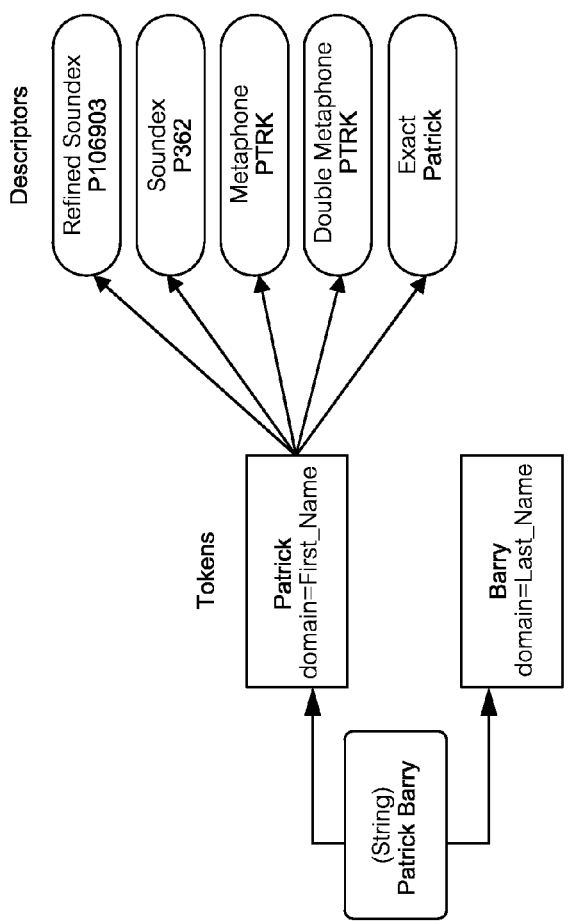

```
rule "Do Not Ask If First Time Joining A Conference If Ani Is Related To A Profile"
    agenda-group "identify-caller"
    when
        AniDetails(associatedProfileCount > 0)
        not( exists( GaveDifferentName() ) )
    then
        insertLogical(new DoNotAskIfFirstTimeJoiningAConference() );
end rule "Ask If First Time Joining A Conference If Ani Has Never Joined A Conference"
    agenda-group "identify-caller"
    when
        AniDetails(conferenceCount == 0)
    then
        insertLogical(new AskIfFirstTimeJoiningAConference() );
end rule "Ask If First Time Joining A Conference"
    agenda-group "identify-caller"
    activation-group "walkthrough"
    salience -1
    when
        not( exists ( DoNotAskIfFirstTimeJoiningAConference() ) )
        exists( AskIfFirstTimeJoiningAConference() )
        callId : CallId()
    then
        AskIfFirstTimeJoiningAConferenceWalkthrough walkthrough = new AskIfFirstTimeJoiningAConferenceWalkthrough();
        walkthrough.setCallId(callId.getId() );
        identityContextInstance.setTransientVariable("walkthrough" , walkthrough);
end
```

Fig. 13

CONFERENCE CALL MANAGEMENT SYSTEM

REFERENCE TO RELATED APPLICATIONS

This application is a nonprovisional of and claims priority to U.S. Provisional Application No. 61/121,041, which was titled "Conference Call Management System" and filed on Dec. 9, 2008. This application also claims priority to U.S. patent application Ser. No. 12/551,864, filed on Sep. 1, 2009, with title "Apparatus and Method for Processing Service Interactions,"; which is a continuation of U.S. Pat. No. 7,606,718, titled "Apparatus and Method for Processing Service Interactions," issued on Oct. 20, 2009; which was a nonprovisional of U.S. Provisional Application No. 60/467,935, titled "System and Method for Processing Service Interactions" and filed on May 5, 2003. This application is also related to U.S. Provisional Application No. 61/142,463, titled "Real-Time Conference Call Transcription" and filed on Jan. 5, 2009, and to a commonly assigned US application titled "Real-Time Transcription" being filed on even date herewith. All of these applications are hereby incorporated by reference herein as if fully set forth.

FIELD

The present invention relates to telephonic communications. More specifically, the present invention relates to telephonic conferencing.

BRIEF DESCRIPTION OF THE DRAWINGS

FIG. 5 is a diagram illustrating the relationship between a string and related tokens and descriptors in the system of FIG. 3.

FIG. 6 is a sample name repository fragment used in the system of FIG. 3.

FIG. 13 is a sample walkthrough rule used in the embodiment of FIG. 3.

DESCRIPTION

For the purpose of promoting an understanding of the principles of the invention, reference will now be made to certain embodiments illustrated herein, and specific language will be used to describe the same. It should nevertheless be understood that no limitation of the scope of the invention is thereby intended, such alterations and further modifications to the illustrated device, and such further applications of the principles of the invention as illustrated therein being contemplated as will occur to those skilled in the art to which the invention relates.

Generally, in some embodiments, the present system provides novel and useful features for conference call participants, such as computer-based interfaces that callers use to authenticate themselves; connect to a particular conference; monitor the status of a call; add new participants; mute lines; start, pause, or resume transcription; and the like. Voice commands achieve many of these control features as well, sometimes applying a human-backed intent-interpretation technique.

Figure 1:
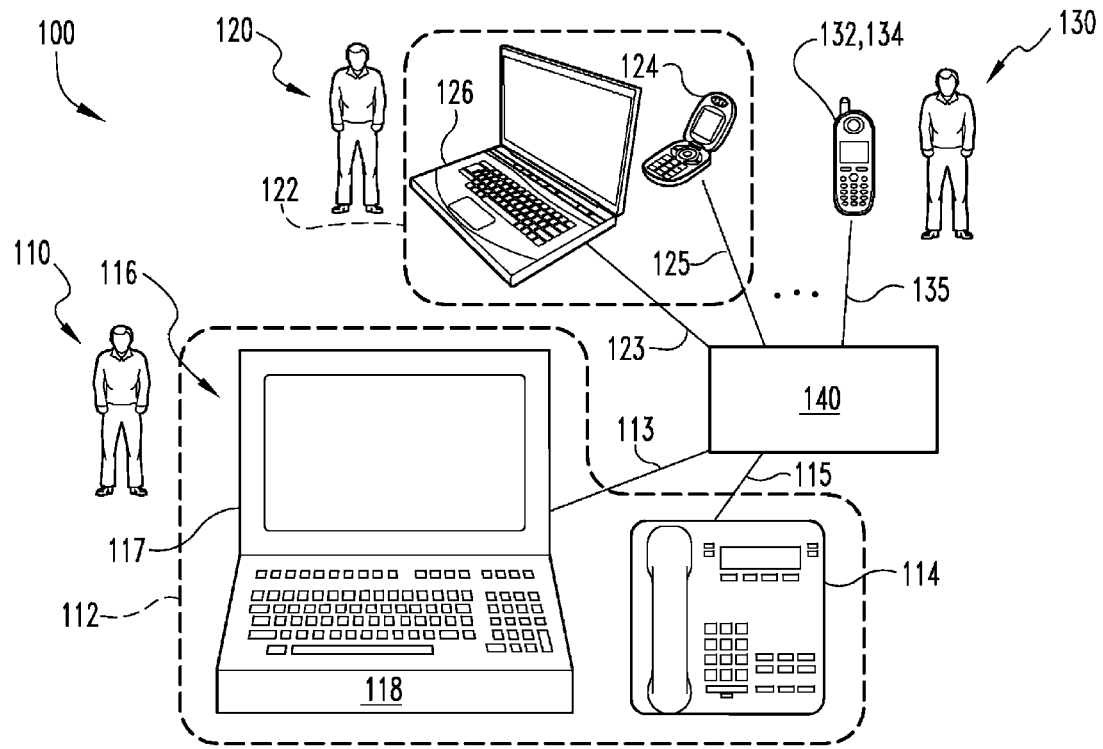
FIG. 1 is a block diagram of participants in a conference call system according to one embodiment of the present description.

FIG. 1 schematically illustrates the participants in a conference call that uses some of the principles of the present description. The overall system 100 connects users 110, 120, and 130 by way of their respective terminal equipment 112, 122, and 132, and the central system 140. Each participant in the call 110, 120, and 130 has at least a voice connection 115, 125, and 135 to central system 140 through a telephone 114, 124, and 134, while one or more participants 110, 120, and 130 may also have a data connection 113 or 123 with central server 140 through computing devices such as computer 116 and laptop computer 126. The computing devices 116 and 126 in this embodiment include a display (such as a monitor 117) and input devices 118 (such as a keyboard, mouse, trackball, touchpad, and the like). Additional persons who are not participating in the conference call may also connect by computer with central system 140 through a data link that is not associated with any particular voice connection. In some embodiments the system discourages or prevents this using authentication or coordination measures, such as prompting for entry through the data connection of information or passcodes supplied through the voice connection.

Figure 2:
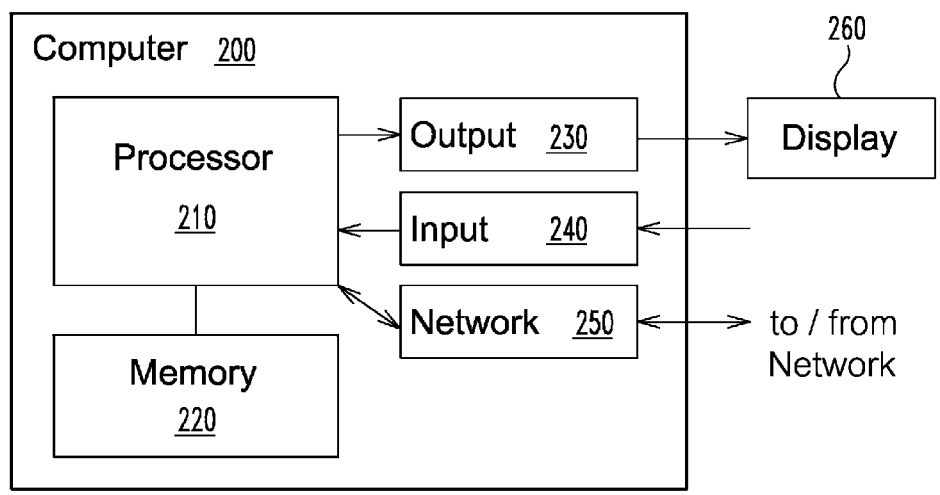
FIG. 2 is a schematic diagram of a computer used, in various forms, in various components of the systems described herein.

The computers used as servers, clients, resources, interface components, and the like for the various embodiments described herein generally take the form shown in FIG. 2. Computer 200, as this example will generically be referred to, includes processor 210 in communication with memory 220, output interface 230, input interface 240, and network interface 250. Power, ground, clock, and other signals and circuitry are omitted for clarity, but will be understood and easily implemented by those skilled in the art.

With continuing reference to FIG. 2, network interface 250 in this embodiment connects computer 200 a data network (such as to internet 360, discussed below in relation to FIG. 3) for communication of data between computer 200 and other devices attached to the network. Input interface 240 manages communication between processor 210 and one or more push-buttons, UARTs, IR and/or RF receivers or transceivers, decoders, or other devices, as well as traditional keyboard and mouse devices. Output interface 230 provides a video signal to display 260, and may provide signals to one or more additional output devices such as LEDs, LCDs, or audio output devices, or a combination of these and other output devices and techniques as are described herein and will occur to those skilled in the art.

Processor 210 in some embodiments is a microcontroller or general purpose microprocessor that reads its program from memory 220. Processor 210 may be comprised of one or more components configured as a single unit. Alternatively, when of a multi-component form, processor 210 may have one or more components located remotely relative to the others. One or more components of processor 210 may be of the electronic variety including digital circuitry, analog circuitry, or both. In one embodiment, processor 210 is of a conventional, integrated circuit microprocessor arrangement, such as one or more CORE 2 QUAD processors from INTEL Corporation of 2200 Mission College Boulevard, Santa Clara, Calif. 95052, USA, or ATHLON or PHENOM processors from Advanced Micro Devices, One AMD Place, Sunnyvale, Calif. 94088, USA, or POWER6 processors from IBM Corporation, 1 New Orchard Road, Armonk, N.Y. 10504, USA. In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Generally, participants 110, 120, and 130 conduct the voice portion of a conference call using techniques that will be understood by those skilled in the art. While the call is in progress, using the techniques and technologies presented in this disclosure, the system provides a virtual assistant backed by a human interpreter of the callers' intent. In this example embodiment, the system uses information about incoming calls to accelerate identification of the caller and selection from among multiple conferences to which the caller might want to connect. Once connected, participant 110 can access a virtual assistant on the conference call by pressing a numeric key on their telephone. The system then interacts with the participant conversationally, with the participant's speech being interpreted by human "intent analysts" who enter input into the system that reflects their interpretation of the participant's intended command (and, as needed or appropriate, other data). The system executes the requested command and provides audio feedback to the participant.

Figure 3:
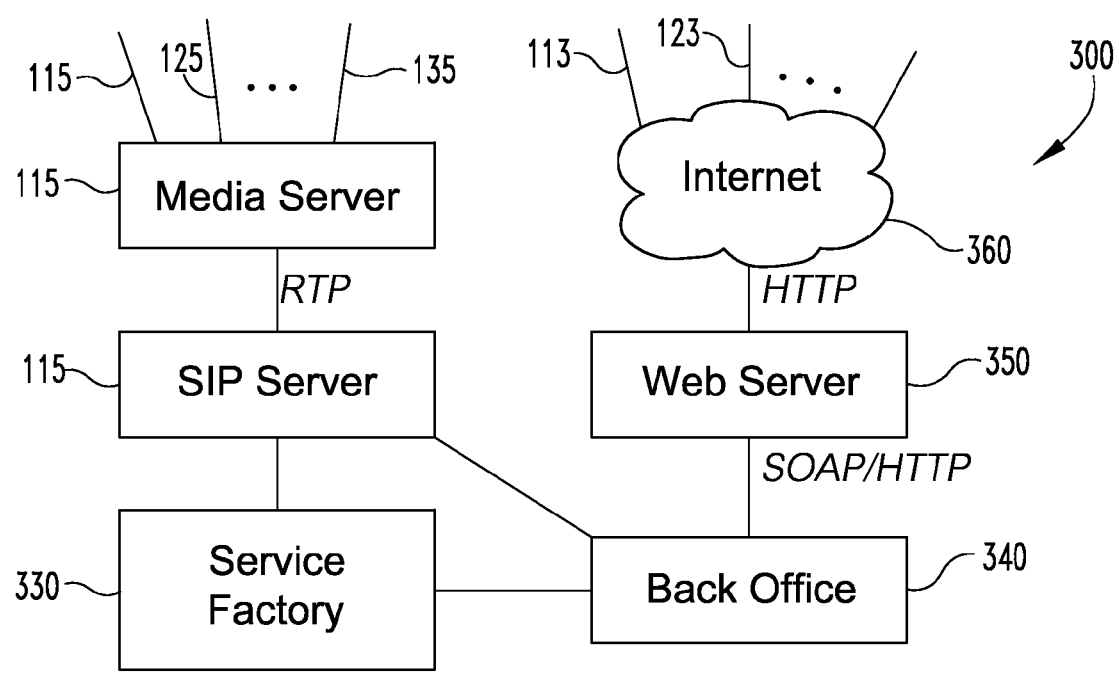
FIG. 3 is a block diagram of data flow through a system implementing the arrangement of FIG. 1.

One form of central server 140 is illustrated in FIG. 3. In this example embodiment, calls arrive via voice lines 115, 125, and 135 coming into media server 310, which converts calls into VOIP sessions within the SIP application server 320. SIP application server 320 coordinates call control and interaction with the media server 310 and service factory 330 (see below) for the life of the connection. Back office 340 presents a SOAP interface to web server(s) 350 for its handling of requests from clients accessing the system through internet 360, data connections 113, 123, etc., and all other clients. Back office 340 implements the business rules and logic discussed herein, manages user profiles, maintains and leverages call history, and the like. Of course, other embodiments will implement other architectures as will occur to those skilled in the art in view of this disclosure.

In this example embodiment, media server 310 is a media gateway, such as those distributed by DIALOGIC (Dialogic Inc., 1515 Route 10 East, Parsippany, N.J. 07054). SIP server 320 is implemented in some embodiments as a SAILFIN server from the open-source software project (see http://salefin.dev.java.net/), which is based on GlassFish Enterprise Server, a Java EE application server. The media server 310 may also include a product of RadiSys Corporation, 5445 Northeast Dawson Creek Drive, Hillsboro, Oreg. 97124.

1 Using a Service Factory

In some embodiments, this system uses a "service factory" as described in U.S. Pat. No. 7,606,718 (the "Service Factory Patent"), which is hereby incorporated fully by reference, to process interactions with conference leaders and participants. Audio from calls is presented by the system to one or more intent analysts who determine the intent of the participant and enter corresponding intent input into an analyst user interface. The analyst user interface presents to the intent analyst a list of most likely matches based on information available to the system. In various embodiments, the system populates the intent analyst interface as a function of relevant, available information, such as time of day, ANI data, authenticated caller data, conference name, conference leader, number and/or identity of other participants in the conference, the history of calls (by the speaker, others on the conference call, or even others not on the call) to the system, and progressive input (of typed keystrokes or mouse clicks, for example) by the intent analyst.

2 Conference Call Experience

In this embodiment, the system 300 uses the service factory 320 in part to make callers' authentication and connection to a conference call much easier and more efficient. For example, many existing conference calling systems require callers to enter a personal identification number ("PIN") so that the system knows the conference in which the caller would like to participate. Unfortunately, this data is often system-generated, so all callers—even the call organizer—must obtain the PIN, retain that PIN from the time the call is scheduled to the time of the call itself, retrieve the PIN when it is time for the call, and enter the PIN (typically using a telephone keypad) to participate in the call. Even when a particular call organizer can always use the same number, it must still be communicated with other call participants, who must remember yet another identification number on top of their usual collection of passwords and the like.

Some embodiments of system 300 use their record of past calls from a particular number, user logins, call participation, automated speaker recognition, machine transcription, and the like to take callers efficiently through the authentication process and connection to a particular conference. For example, when the system receives a call, it captures the particular number (determined, for example, using ANI information) or other source information (from the POTS, VOIP, or other network, for example) from which the call originated.

In this embodiment, conference call participants do not need to know a conference number or PIN in order to access a particular conference. With certain exceptions (discussed below), the system asks callers to say their name and the name of the conference or conference leader, and they may immediately be connected. At the option of the call leader, the system may require callers to know and say a password (when prompted by the system) before they are permitted to join. In some embodiments, the system is configured to use available information to infer the identity of the caller and adapt the authentication process accordingly. For example, if all calls bearing a particular ANI have been associated with the same user, new calls bearing that ANI might prompt the user's name with "Are you <name>?" In some of these embodiments, the prompt for a password might also be dispensed within such circumstances. Other adaptations are described below.

A user interface, such as a telephonic, web-based, application-framework-based, or other interface, allows individuals to see and manage conferences that they have scheduled and conferences to which they have been invited. The interface allows the user to schedule new conferences, for example, or add a telephone number to already scheduled or in-progress conferences so that the system calls the user (for future conferences, then it calls at the appointed conference time), and that participant does not have to call in himself and navigate to the appropriate conference. Even for outgoing, user-adding calls, the system may still prompt the call recipient for authentication information, such as a pass phrase or personal information.

When in a conference, participants can press their phone's pound ("#") key to be "connected" to a virtual assistant in a private side conversation, or "sidebar." In this embodiment, when this connection is activated, the system 300 saves the state associated with user 110, 120, or 130 in the main conference, mutes that caller's audio output (so they are no longer heard in the main conference), and redirects the caller's audio to a new "prompt conference." SIP server 320 adds service factory 330 into the "prompt conference" and also adds a one-way (input) audio connection from the main conference at reduced volume (such as 75% of its normal, full volume). A prerecorded audio prompt is played for the participant, requesting a command.

After a command is given, feedback from the system concerning execution of the command (acknowledgement, success, failure, or delay notices, for example) is mixed into the audio being sent to the participant's audio device. The participant may press the pound key again to restore his or her connection state in the main conference, or the system may automatically restore his or her connection to the main conference if the command has been gathered and the system determines that no additional information is needed. The participant can even toggle between the main conference and the private conference with the attendant as necessary by pressing the pound key. In any case, when the user switches back to the main conference, the caller's audio is muted in the prompt conference and redirected to the main conference, effectively unmuting the caller. If the command is still being processed, or if the system otherwise expects to require additional information from or provide feedback to the user in connection with the command, then the prompt conference is maintained with unmuted input only from service factory 330. When all interaction relating to apparently complete, the system 300 tears down the prompt conference, disconnecting the service factory 330 and the caller, and freeing resources that had been allocated to that conference. If further direct, "sidebar" interaction between the user and the system is needed, another "prompt conference" is setup.

One or more interfaces (also called "clients" herein) are provided to show users the details of the conference that they are currently on in substantially real time. This interface may allow the users to issue system commands using a computer interface that could be spoken to the virtual attendant. In various embodiments, this interface is provided via a web or mobile interface, for example, though additional alternatives will occur to those skilled in the art in view of this disclosure. The interface may also allow users to see an indication of a conference to which a particular user has been invited and that has started, but the user is not currently in, so that with a click on a "join now" button, the virtual operator can dial out to the user, knowing who he or she is, and which conference he or she wants to join, simultaneously connecting the user via mobile or web application to the real-time view.

The user interface(s) also sometimes provide information about past conferences. For example, conference data (including audio, video, text, and metadata about the conferences) may be shown, played, and searched through the user interface. In fact, if a conference was recorded with an A/V presentation and a transcript, the user could play back the audio, video, and text in a synchronized session, just as had been done in the original presentation.

In some embodiments, the name capture technology described herein, when combined with transcription, allows the user to issue advanced searches across multiple past conferences. A presentation of a conference history also enables the user to schedule a new conference with the same parameters (e.g., participants, time of day, day of week, telephone numbers used, documents available, and matter reference number) as a previous one—at least as a starting point for the setup of the new conference.

3 Alternative Interfaces

The system also makes a web interface available to call participants. For example, a participant may access a web site and authenticate himself, either with a username and password or using one or more other techniques as will occur to those skilled in this area of technology in view of the present description. The system then presents the participant a web interface that is logically connected to his voice line. The web interface, therefore, can be used to control the user's line (muting and volume, for example) and perform other operations as a function of the user's role in the conference.

Her identity and/or her role can also be used to adapt the web interface, applying permissions and adding, disabling, or removing other features. In some embodiments, the system monitors each audio line individually, and the web interface may present visual "active speaker" indicators in the interfaces that show which participants in the conference call are talking at any given time. The interfaces may also allow the leader to schedule the conference in advance, in which case the virtual assistant will call and automatically request (by playing prerecorded audio) the individual to join at the scheduled time, or the leader may choose to start the conference immediately. Another portion of the web interface may present text-based chat, whiteboarding, file sharing, or application sharing with some or all of the other participants in the conference call and, in some embodiments, with still other parties.

The web-facing SOAP interface (or similar service) in this exemplary embodiment (see further discussion below) enables clients (using system interfaces or even third party clients) to be developed for other platforms to implement some or all of the features described herein. For example, IPHONEs, smartphones, and handheld PCs can run programs that implement many of these same features, leveraging the data link and user interface features that are available to those devices to provide conference call management and enhancement on convenient and common platforms.

4 Adaptive Authentication and Conference Selection

As a person participates in more conference calls over time, the system 300 learns the habits and patterns of that person's use of the system. For example, if a particular telephone number is listed in Joe Smith's profile with the system, and Joe Smith is the only one who ever calls from that number (or he is the caller from that number at least x % of the time over at least y calls), then the system might shorten the authentication process for calls received from that number to "Are you Joe Smith?" If a pattern is consistent enough, and a new call fits the pattern with a high enough level of confidence, the system might even assume authentication and skip that prompt altogether.

Likewise, the system 300 uses other aspects of incoming calls and its history of managed calls to guess to which conference that caller might wish to be connected. For example, if several participants call in from area code 317 for a "developer team meeting" every Wednesday morning just before 10:00, and another call comes in at close to that time from that area code from a caller who has participated in those calls before, then the system might simply authenticate the caller, then ask the caller whether she is calling for the developer team meeting. In other embodiments, or if the pattern is sufficiently consistent, the user might be connected to the developer team meeting without a prompt. This technique of recognizing and applying patterns in call data saves a great deal of time and trouble in connecting individuals to their conference calls. The system for collecting, analyzing, and applying this kind of data to facilitate authentication and connection to a conference is discussed in additional detail herein.

In various embodiments of the system 300, the principles described in the Service Factory Patent are applied to a wide variety of recognition tasks described herein. For example, an audio stream of a caller's answer to a prompt "What's your name?" might be sent to an intent analyst who listens to the audio and enters into the system his or her interpretation the caller's intent. For example, the intent analyst might select the name the caller spoke from among a list of individuals who have called from the caller's area code at the particular time of day at which the present call arrived. The intent analyst's interface might include or exclude persons from the list as a function of automatic transcription of the audio, ANI data, confidence and/or identification data from automatic transcription, time of day, day of week, and the like.

The service factory 330 is also called upon for interpretation of caller's requests of the system, such as for application of particular features by way of a sidebar conference, as discussed above. When a caller presses the "#" key, for example, the system plays an audio prompt and captures the audio from the caller, and an intent analyst interprets the intent of the caller. In some embodiments, service factory 320 presents options for interpretation of the caller's command based on the frequency of those selections, adapted in some embodiments based on the history of commands issued by that particular caller. The system then responds automatically to the intent that is captured by the intent analyst.

In some embodiments, "double checking" of intent analysts' interpretations is performed as system load permits. Double checking involves the playing of caller audio for more than one intent analyst. If the intent captured by a majority of the analyst's is the same, that intent is selected as the intent of the caller, and business rules applied by service factory 330 and other components in the system 300 automatically respond accordingly. In some situations, the audio is played for two or more intent analysts. If they disagree, an additional "tiebreaker" intent analyst reviews the audio and determines which was the correct intent. In some embodiments, double checking is automatically performed for all input that arrives when a person's name, conference name, or password is expected based on the call context. In other embodiments, double checking is forced for more, fewer, or other categories.

Additional discussion regarding filling the intent analyst's interface is presented in the "Fuzzy Name Matching" section just below.

5 Fuzzy Name Matching 5.1 Fuzzy Name Matching—Background

The service factory 330 uses humans (analysts) to capture the intent of a given caller's "utterance." These utterances could be the name of the conference the caller wants to join, an email address they wish to register, the account number for which they wish to hear the balance, etc. In the pursuit of trying to capture a caller's intent quickly, yet without jeopardizing accuracy, a system design called the "Blooming Flower Architecture" was created. This framework enables any number of services to run inside a central process and utilizes a "push" method of providing possible answers to the analyst. This "push" method of some embodiments removes most or all of the guesswork and enables analysts to choose from a list of possible matches, as opposed to having to type out the entire answer.

6 Blooming Flower Architecture Overview

Blooming Flower is a Java Message Service ("JMS") solution that allows the intent analyst's interface device (one example is described in the Service Factory Patent) to send requests to a specific "service" and receive a response within milliseconds. The request might take the form of a partial address, and the response would return a list of fully qualified and verified addresses pulled from the U.S. Postal Service database. Another service might take a partial user name and return a list of possible matches from a back office database. Still other services are provided in system 300 as will occur to those skilled in the area of technology.

Figure 4:
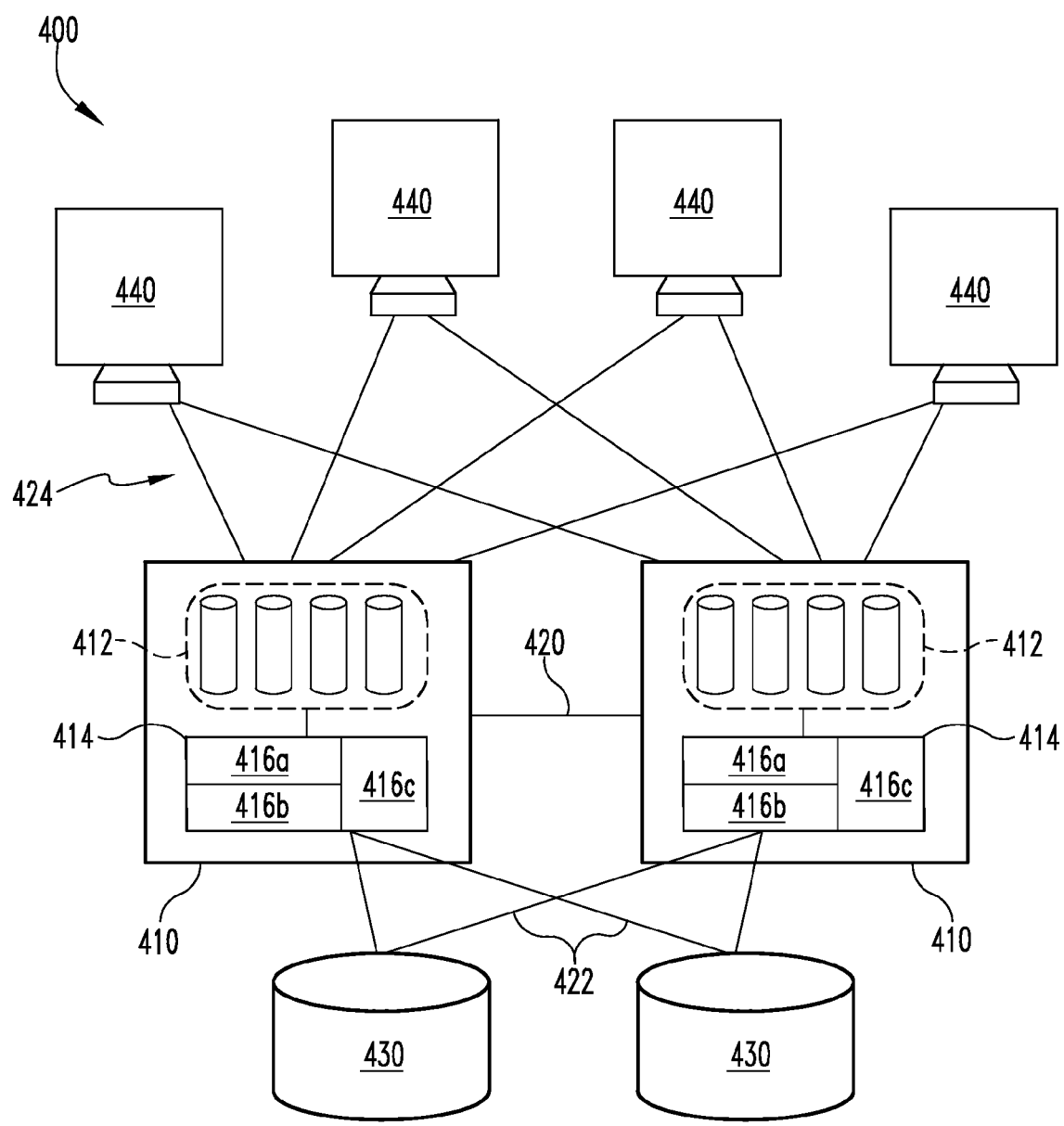
FIG. 4 is a block diagram of a messaging, service, and storage system used in the embodiment in FIG. 3.

The goals across the collection of services in this example embodiment are: cut down on the amount of time it takes to capture information, increase accuracy, obsolete customized/throw-away code, and decrease development time on reusable components. FIG. 4 illustrates an implementation 400 of the Blooming Flower Architecture. Message brokers 410 are connected to each other via high-speed network connection 420, and to back office data centers 430 by way of data connections 422. Terminals 440 maintain redundant connections to multiple brokers 410 through data network 424. In some embodiments, network connections 420 and 422 and data network 424 use the public internet, while in others private, specialized or other data networks are used as will occur to those skilled in this technology area.

When a terminal 440 comes online, it connects automatically to at least one of the brokers 410. It creates a queue through which to receive responses to its queries. When it needs data from the system, it sends an asynchronous request to one of the service queues 412, which are automatically created upon startup and/or instantiation of leaf server 414. Leaf server 414 pops the request off the queue 412 and routes the request to one or more appropriate services 416a, 416b, and 416c, for example. The service in leaf server 414 processes the request, which sometimes includes making a call to a back office data center 430. Responses generated by the service are placed in the queue for terminal 440. Terminal 440 pulls the response from the queue and uses the information to update its display for the intent analyst operating it.

If one of the brokers 410 is unavailable, terminal 440 automatically falls over to the other broker 410. Queues 412 are distributed across a network of brokers 410 using redundancy to allow connection to any broker 410 and fail-over to a working broker 410 if anything goes wrong with another broker 410. If a leaf server 414 dies, any unacknowledged messages are redelivered to a queue 412 of another leaf server 414. If a leaf slows down, other leaf servers 414 pick up the slack.

Each service 416x supports an "isAvailable( )" method that lets the leaf server know whether it is available. In this implementation, it is up to each service to set this property appropriately and perform whatever steps are necessary to "fix itself" or raise an alert to an operator in the event of a failure. For example, since the address capture service uses a database, then when that database is unavailable, the service will page a technical operations specialist and switch to a backup database.

6.1 Fuzzy Search Service

The Fuzzy Search Service, consisting in this example of one or more of services 412, is used to help overcome typographical errors and word substitutions in connection with intent analyst entries, and to decrease convergence issues (two analyst answers looking totally different). The Fuzzy Search Service can be broken down into three components:

1) An internal database populated with data from external resources. The tables holding this data are referred to as "repositories." Repositories can be populated in real time, dynamically during operation, or on startup. Data is stored in these repositories and kept in memory for fast access.

2) A parsing tool to manipulate both queries and repository entries to support more accurate and efficient comparisons between them.

3) A service layer that leverages the present architecture. Any number of services can be created to expose fuzzy matching functionality. Suggested uses of the fuzzy search include matching names of people, email addresses, postal addresses, and FAQs. A base service is created for each requested knowledge "domain," and then each business team extends the base functionality to apply its own business rules.

6.2 Parsing Rules

Each query or repository entry in this embodiment is parsed as a function of its domain.

6.3 Names

When a name string is passed to the Fuzzy Search Service, the system first trims leading and trailing spaces and removes any non-alpha-character from the string. It then cuts the string into subelements, parsing on any spaces found.

If there is only one element, then a search is performed on both first and last names.

If there are two elements, then a search for the first one is performed on first names, and a search for the second one is performed on last names.

Substitution values are added where possible to query strings passed in.

6.4 Repositories

Repositories are populated by strings that are broken down into smaller elements called tokens. Each token is assigned a domain, and domains can be weighted to count more or less in the scoring of a match. These domains are currently supported:

1. PLAIN_MATCH (weight=1*score)
2. FIRST_NAME (weight=1*score)
3. LAST_NAME (weight=1*score)

The tokens are then broken down further into descriptors. The current embodiment uses five types of descriptors:

1. Exact
2. Metaphone
3. DoubleMetaphone
4. Soundex
5. RefinedSoundex

The system first passes the entire string value (e.g., "Patrick") of the token into the descriptor factory and captures the descriptors generated. Then a character is removed from the end (e.g., "Patric"), and the remaining letters are run through the descriptor factory again. This process is continued until no characters remain. During this process, only the new descriptors are captured. If, for some reason, a duplicate descriptor is received, it is ignored. FIG. 5 illustrates the beginning of this process. Once all the descriptors for a given token have been produced, a new entry can be inserted into the repository. FIG. 6 illustrates a typical name repository.

6.5 How a Score is Calculated

When one queries a repository, it returns a list of ResultSets holding the scores of how confident the system is of the match. To obtain that score:

1) The query object is broken down into tokens, and the tokens are assigned descriptors.

2) The system loops through the query tokens/descriptors, building a list of those that match entries in the repository. In this embodiment, items are matched on a multi-key, such as domain, descriptor type, and descriptor value.

3) All the scores for each token are rolled up, and the total for each is assigned to its owner. The owner of each token is the actual matching value that was pulled from the repository.

6.6 How Do Descriptors Get Assigned Values?

This section walks through an example of value assignment: *Query="Patrick Barry"*

1) This string will be broken down into two tokens.
[First_Name="PATRICK"]
[Last_Name="BARRY"]

In this embodiment, each type of token can be assigned a multiplier that can give that particular token a bump up or down in scores. Most tokens will have a multiplier of 1, so they are weighted equally. However, if one wanted to make Last_Name more important than First_Name, all they have to do is give First_Name a multiplier less than 1, such as 0.95.

2) Next, the MAX_SCORE of any descriptor is arbitrarily set to be 1000. Other maximum scores will occur to those skilled in this technology area.

3) The system then calculates the "Decreasing Factor." Remember, when one generates the descriptors for a token, they iteratively drop characters off the end of the token until no characters are left. With every truncation, the value of that descriptor should decrease by a certain factor. That is where the "Decreasing Factor" comes into play. In this example:

Decreasing Factor=MAX_SCORE/LENGTH OF TOKEN VALUE

So scoring for "PATRICK" would be something like:
PATRICK=Score 1000*<token multiplier>
PATRIC=Score 857*<token multiplier>
PATRI=Score 714*<token multiplier>
PATR=Score 571*<token multiplier>
PAT=Score 428*<token multiplier>
PA=Score 285*<token multiplier>
P=Score 142*<token multiplier>
DECREASING FACTOR=1000/7=143 (rounding up).

6.7 Exception to the Rule

The "Exact Descriptor" is weighted differently and does not decrease in value as characters are removed. Therefore, every time one can match to an Exact Descriptor, the score for that descriptor will go up MAX_SCORE*<token multiplier>.

7 Identity Framework

To compete with PIN-based conferencing services, the present system had a design goal of a 99.9% accuracy rate for identifying conferences and callers. Through testing of an early version of the system, the need for an identification mechanism became apparent. Some embodiments of the service factory 330 work best when provided with conversation-style utterances. But with the need for the present system to place the caller into the conference in a minimal amount of time, the virtual attendant in this system gives short prompts to callers and expects short utterances in reply. The content of most of these short utterances, being formal names, can be very challenging for the service factory 330 to process. There being limitless variations in the spelling and pronunciation of names, at times callers themselves are not certain how to pronounce the name of the conference they are calling to join, as they may be reading the name from an invitation received via email.

The identity framework provides the exemplary system 300 with the means to obtain the desired accuracy rate. The Identity Framework achieves this in the present embodiment by integrating a fuzzy search capability into the service factory 330; gathering various data points, referred to as "facts" within the context of the framework, from the service factory 330 and the system's data repository; utilizing a rules engine in the back office 340 to process the facts; and leveraging a graph-oriented programming paradigm to navigate through the complexity of the framework.

8 Architecture Overview
8.1 Existing Constraints

The present system 300 provides multiple interfaces for users to be able to join a conference. The identity framework accommodates these interfaces. While some user interfaces may employ unique interactions, the core of the identity framework is designed to be user interface agnostic.

8.2 Requirement Constraints

The commercial success of the present system depends in some circumstances on its ability to successfully identify conferences and callers without the use of PINs. In many contexts, this requires that the system be capable of identifying a conference through non-unique facts. In addition, the identification process is often completed in a timeframe comparable to or better than that of a PIN-based entry system. Of course, the more ambiguous the available facts, the more time the identification process will require. This caveat is acceptable in some embodiments only when the result is the placement of the caller into the correct conference, and the timeframe is within 60 seconds for a first-time caller and 20 seconds for a caller's second and subsequent calls.

9 Architectural Components
9.1 Drools

In a traditional system, business rules are interwoven with the mechanics of the system. Over time, this degrades the maintainability of the system and decreases the likelihood that the system will behave as the business has defined. This could be thought of as the tunnel vision of development. By interweaving business rules with mechanics, adding or modifying business rules often has unforeseen negative impacts on other business rules. The scope of such changes is too broad to fully understand the impact. This leads to a less dynamic system and becomes a barrier to the business's ability to adapt effectively to changing circumstances.

Figure 7:
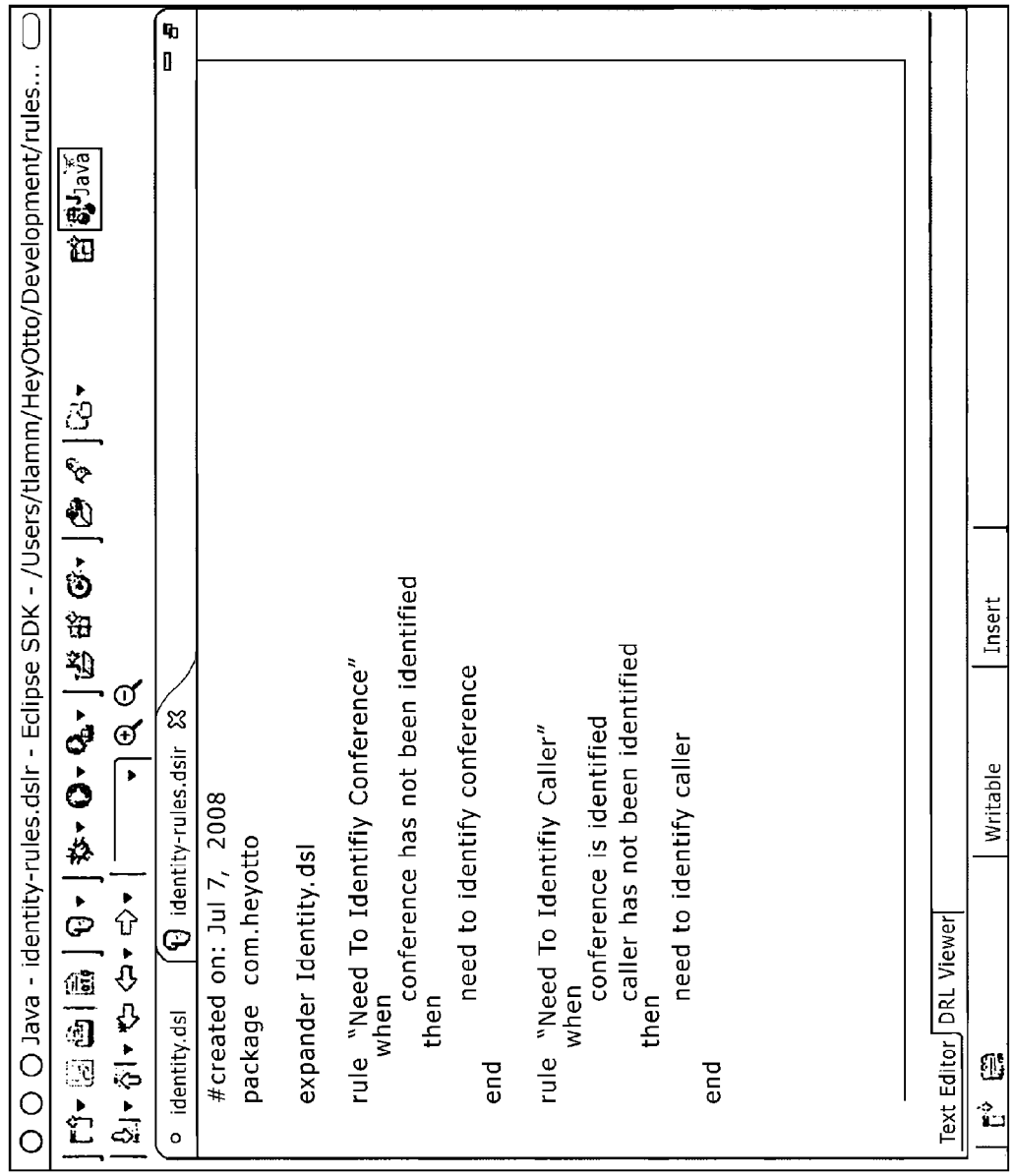
FIG. 7 is a display showing two sample rules used in the system of FIG. 3.

The present exemplary system uses Drools, an open-source business rule management system, to encapsulate business rules from system mechanics. Drools facilitates a Domain Specific Language (DSL) approach to writing business rules. DSL is the ability to abstract the business rules from their technical implementation. As illustrated in FIG. 7, DSL enables the ability to have business rules written in an approximation of plain English. These rules are converted into XML and loaded into the Drools rule engine. If a business rule changes, the modification is made in the rule file, and the new XML is loaded into the Drools engine. In this exemplary embodiment, the new rules can be loaded without the requirement to restart the application servers. This allows for zero-down-time deployments.

Another advantage of using Drools in the present embodiment over certain alternative subsystems is its implementation of the RETE pattern matching algorithm. This algorithm has been proven fast and efficient. It saves processing cycles over traditional business rule code, which utilizes nested IF statements, FOR loops, and the like. With the RETE algorithm, only rules that match the facts are executed.

9.2 jBPM

As systems grow in complexity, so does the task of visualizing the various process flows. This increases the risk of misunderstanding the true process flow and can result in unreliable and inefficient enhancements to the system. Even if diagrams were created during the initial design of prior systems, they often become outdated as business requirements change and the system is altered. The outdated documents then bring a false sense of understanding of the state and operation of the system.

Figure 14:
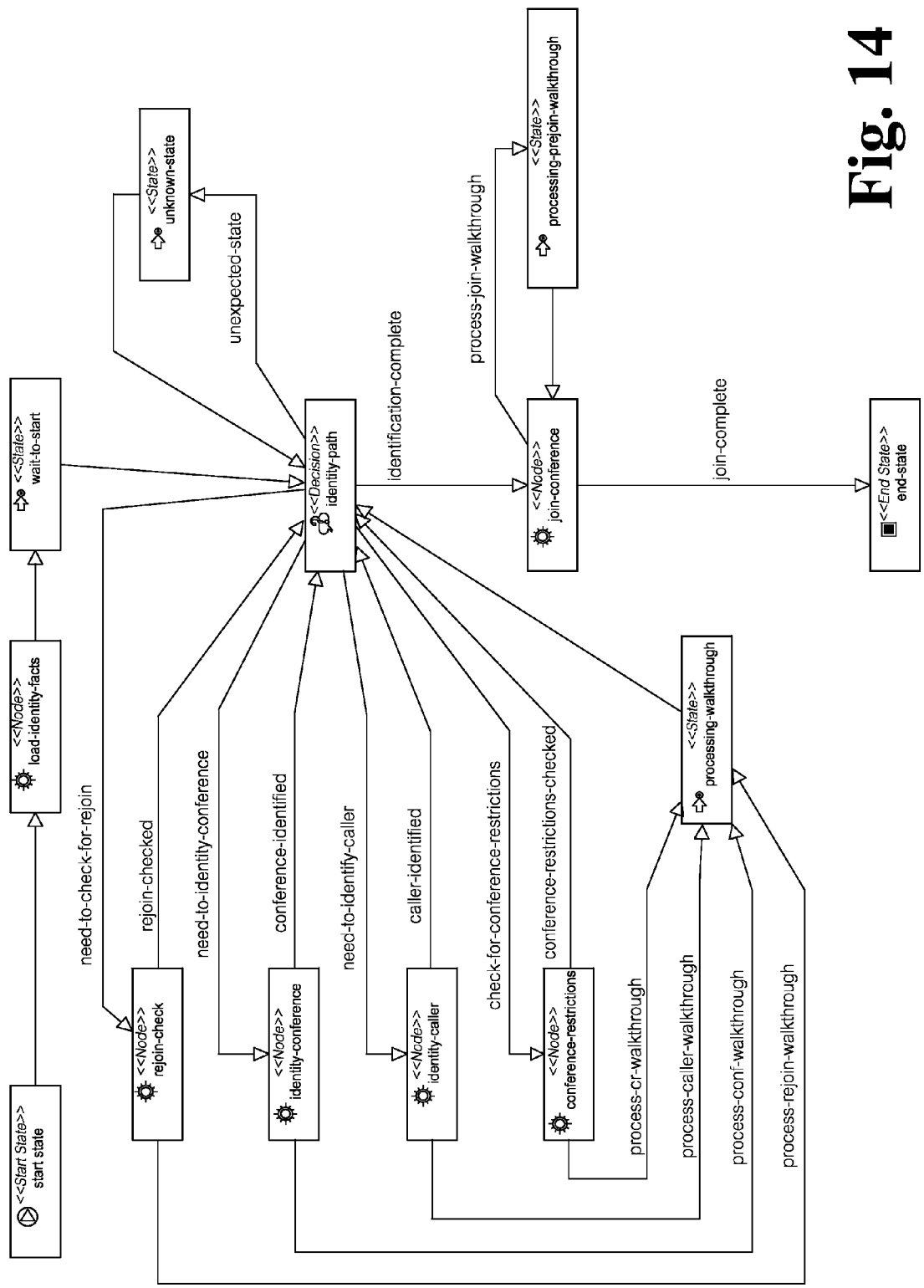
FIG. 14 is a process diagram of the process in the embodiment of FIG. 3.

The present embodiment remedies this issue through the use of jBPM, an open source business process management project. jBPM takes a graph-oriented programming approach to developing business processes. jBPM allows for various Process Definition Languages (PDL) to be used to diagram business processes. The present embodiment uses the jPDL implementation, a subproject of jBPM. See FIG. 14 for an example graph of the process.

jPDL allows a visual representation of the process flow that is also part of the actual implementation of the business process. The diagram in FIG. 14 reflects one possible process flow in this implementation. The jPDL diagram is converted to XML and then loaded to the jBPM engine at runtime. If the business requires a change in process flow, then the diagram is altered and the XML is fed into the jBPM engine without the need to restart the application server, again allowing for zero-down-time deployment of the new process flow.

10 Architectural Modules
10.1 Call Manager
10.1.1 Process Definition The identification process in this embodiment is defined in a jPDL process definition diagram. The diagram also contains mappings of nodes to action and decision handlers. These handlers implement the work that the node requires.

10.1.2 Process Instance

The execution path of the identification process in this embodiment is contained in a process instance. The process instance maintains the state of the caller's identification process. It obtains references to system resources and controls the movement of the process along the path outlined in the process definition.

10.1.3 Walkthrough

A walkthrough is a definition of a fact-finding requirement. For example, if the conference has not been identified, a "Conference Name" walkthrough will be executed in some embodiments. This walkthrough in such embodiments identifies all information required for a user interface to present to the user pertinent information to reach the result of the user identifying the conference to which he or she wishes to be connected. Walkthroughs generally contain a collection of logic and known facts, together allowing the designer of each user interface in the system to decide how it prefers to present the facts to the user to gather any additional facts needed for interaction with and operation of the system.

10.1.4 Business Rules

The business rules in this exemplary embodiment are consolidated into Drools DSL files. The call manager stores the facts used in an identification process in a Drools working memory component. As the identification process moves along the path defined by the business rules, action and decision handlers fire the Drools rule engine to determine the actions to be taken, and the system executes those actions.

Each walkthrough has a corresponding DSL file containing the rules that determine whether the walkthrough requires execution. Each walkthrough DSL file in this embodiment follows a common format: rules to generate a DO NOT ASK logical fact, rules to generate an ASK logical fact, and a single rule to check for the existence of an ASK fact and the non-existence of a DO NOT ASK fact. If an ASK fact exists and a DO NOT ASK fact does not exist, the walkthrough will be executed. This enables complex rules to be written in a relatively straightforward manner, such as that illustrated in FIG. 13.

Following this approach facilitates the use of complex rules that would be rather cumbersome to develop with a traditional development approach. For example, consider a walkthrough that determines whether the caller is user John Smith: the "Is this John Smith?" walkthrough. This walkthrough gives a personal touch to the system by asking the caller if they are who the system "thinks" they are. Implemented without Drools, the rule to determine whether or not to execute this walkthrough was fairly simple: "Had the same name been captured for the previous two calls for the given ANI?" This caused users of phones in conference rooms never to experience this personal touch. By using Drools and the walkthrough rule format, a more complex rule set can easily be added. A community ANI rule has been created to determine the likelihood that the ANI is a conference room phone. If the system determines this to be the case based on the community ANI rule, then another rule will check for the previous two names for a given ANI, also considering the conference name given by the caller. This allows each call from a conference room by a different person to experience the personal touch of "Is this John Smith?"

In one embodiment, the following walkthrough rules are used in the identification process:

"Ask If Caller Wants To Rejoin Conference" Walkthrough:
If Caller Confirmed To Rejoin Conference Then Set Leader Name
If Caller Confirmed To Rejoin Conference Then Set Caller Name If It Is Not Null
Rejoin Has Been Checked If Caller Confirmed Rejoin
Rejoin Has Been Checked If Caller Denied Rejoin
Rejoin Has Been Checked If It Has Been Ruled Not To Ask If Caller Wants To Rejoin Conference
Do Not Ask If Caller Wants To Rejoin Conference If There Are Other Active Calls With The Same ANI
Do Not Ask If Caller Wants To Rejoin Conference If It Has Already Been Asked
Do Not Ask If Caller Wants To Rejoin Conference If Call Context Is A Launch Conference
Do Not Ask If Caller Wants To Rejoin Conference If Call Context Is A Call Contact
Do Not Ask If Caller Wants To Rejoin Conference If Rejoin Details Do Not Exist
Ask If Caller Wants To Rejoin Conference If Rejoin Details Exists
Ask If Caller Wants To Rejoin Conference
Ask For Caller Name Walkthrough:
Do Not Ask For Caller Name If Caller Name Has Been Identified
Do Not Ask For Caller Name If The Caller Has Confirmed This Is The First Time Joining A Conference
Do Not Ask For Caller Name If It Has Been Asked 2 Times Already
Do Not Ask For Caller Name If Caller Wants To Be Anonymous And Was Anonymous On A Previous Call And Not A Community ANI
Do Not Ask For Caller Name If It Has Been Asked And Identity Has Timed Out
Ask For Caller Name If Possible Caller Name Denied
Ask For Caller Name If Caller Wants To Be Anonymous
Ask For Caller Name By Default
Ask For Caller Name
Ask If First Time Joining A Conference Walkthrough:
Do Not Ask If First Time Joining A Conference If Caller Name Has Been Identified
Do Not Ask If First Time Joining A Conference If It Has Already Been Asked Once
Do Not Ask If First Time Joining A Conference If A Name Has Been Previously Captured For This ANI
Do Not Ask If First Time Joining A Conference If Rejoin Confirmed
Do Not Ask If First Time Joining A Conference If Call Context Is A Call Contact
Do Not Ask If First Time Joining A Conference If Call Context Is A Launch Conference
Do Not Ask If First Time Joining A Conference If Not New ANI And No Name Has Been Previously Captured
Do Not Ask If First Time Joining A Conference If ANI Is Related To A Profile
Ask If First Time Joining A Conference If ANI Has Never Joined A Conference
Ask If First Time Joining A Conference If Analyst Chose Gave Different Name
Ask If First Time Joining A Conference
Ask If This Is So And So Walkthrough:
Do Not Ask Is This So And So If Caller Name Has Been Identified
Do Not Ask Is This So And So If It Has Already Been Asked Once
Ask Is This So And So If ANI Belongs To A Single Profile And Is A Cell Phone
Ask Is This So And So If ANI Belongs To A Single Profile And Is A Home Phone
Ask Is This So And So If At Least The Previous 2 Names On The ANI Have Been The Same And The ANI Is Not A Community ANI
Ask Is This So And So If At Least The Previous 2 Names On The ANI For A Given Leader Have Been The Same And The ANI Is A Community ANI
Do Not Ask Is This So And So If Caller Name Is 'Web Tester'
Ask Is This So And So
Ask To Speak And Spell Caller Name Walkthrough:
Do Not Ask To Speak And Spell Caller Name If Caller Name Has Been Identified
Do Not Ask To Speak And Spell Caller Name If It Has Already Been Asked
Ask To Speak And Spell Caller Name If Analyst Chose Gave Different Name For Call Contact Context (a.k.a. Dial out)
Ask To Speak And Spell Caller Name If Caller Confirmed This Is The First Time Joining A Conference
Ask To Speak And Spell Caller Name If Analyst Chose Gave Different Name And Is Not New ANI And No Name Has Been Previously Captured
Ask To Speak And Spell Caller Name 10.2 Back Office-Call Service The call service has been developed to capture facts for the identity framework. Any component in the present system can load the call manager's working memory with facts via the call service. In addition, the call service provides a means for any user interface to determine whether the identification process requires any additional walkthroughs to gather facts. An additional walkthrough is typically necessary, for example, if the identification process is unable to determine the identity of the conference and/or caller.

10.3 Service Factory 10.3.1 iXML Script

In some embodiments, a script contains the process flow for obtaining the information required for identification of the caller. Within the identity framework, the process flow logic is removed from the script. Like other user interfaces in the present system, the script sends a request to the call service to discover which walkthrough the script should process. As the script processes the walkthrough and obtains facts from the user, it submits those facts to the call service. Moving the process flow to the identity manager allows for changes in the ordering of walkthroughs without modification to the script. It also promotes consistency across all user interfaces.

10.3.2 Blooming Flower

A tool in the present system for identifying conferences and callers is the fuzzy search functionality implemented with the Blooming Flower Architecture (see the "Fuzzy Name Matching" section herein). The ability for the service factory 330 to perform fuzzy searches on names increases the accuracy provided by the service factory 330. In some embodiments of the system, the service factory 330 treats the names "John" and "Jon" differently. As both names sound the same when spoken, it is nearly impossible for the service factory 330 to capture whether the caller's intent is "John" or "Jon." Fuzzy search allows the service factory 330 to treat the two names the same. This enables the service factory 330 to capture the caller's intent simply as a name, regardless of the spelling of the name.

11 Rich Client-Side Application

The Rich Client-Side Application (RCSA) of the present system is a web-based, browser-agnostic graphical user interface for the consumption and production of conference events in the present system. In this embodiment, the realization of conference events to the client happens in real time, or as close to real time as possible. The RCSA provides an intuitive means for conference interaction by a user, including but not limited to issuing commands such as muting his/her line, volume control, instant messaging, etc. Users are also privy to conference events produced by other users, including the conference leader, including presentation files, shared documents, screen sharing, whiteboarding, and the like.

12 Architecture Overview

12.1 Existing Constraints

In some embodiments, most communication in both the service factory 330 core and the present system is done by means of the Java Messaging Service (JMS), though other embodiments use different communication frameworks. Therefore, to integrate easily with these systems, the RCSA at a minimum should be able to produce and consume JMS messages. Since this implementation of the application is a web-based application, communication traverses either port 80 (HTTP) or port 443 (HTTPS) in a streaming fashion, given that most firewalls allow outbound access to these ports. The application is thus accessible regardless of a user's choice of web browser.

12.2 Requirement Constraints

The system's authentication is handled by back office 340. Back office 340 uses event-driven and service-oriented architectures with JMS and SOAP as transports. The authentication mechanism is accessible via web service calls using SOAP, while authorization is handled by JMS message routing based on authentication credentials and session identification. The RCSA consumes these features.

In addition to authentication and authorization, security on the wire is also a priority in many embodiments, so the RCSA in the present embodiment employs the web standard for encryption, HTTPS. Other embodiments will apply different transport encryption systems, or no encryption at all, as will occur to those skilled in this area of technology.

The RCSA processes conference events as close to real-time as possible, therefore performance of the message consumption/production module is good. In some embodiments the RCSA consumes messages at an average rate of 100-120 milliseconds, and a round trip of producing and consuming messages occurs at an average rate of 140-180 milliseconds or better.

13 Architectural Components of Client-Side Messaging System

Figure 8:
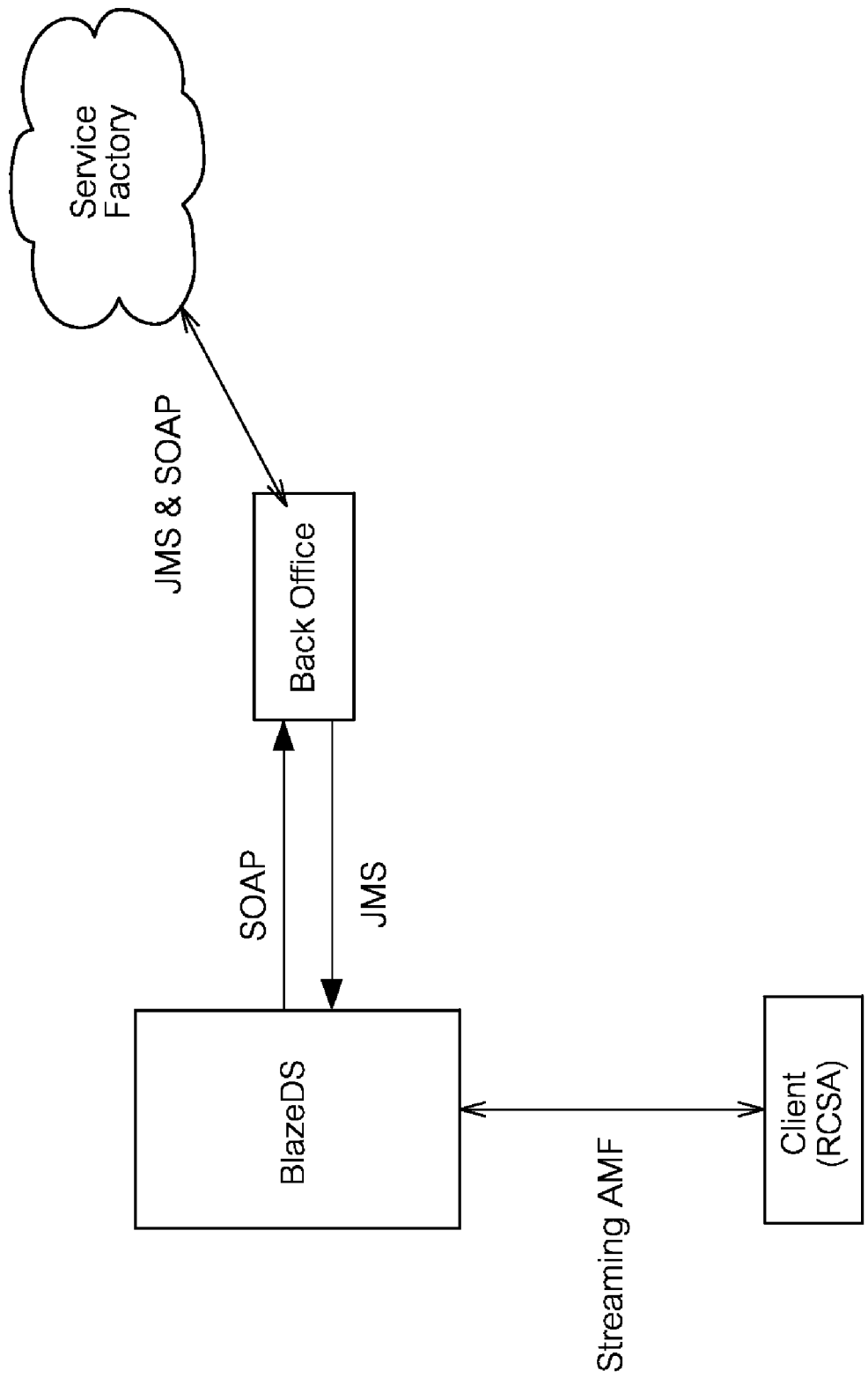
FIG. 8 is a block diagram of a client-side messaging system used in the system of FIG. 3.

The components of an example RCSA messaging system are illustrated in FIG. 8.

13.1 Adobe Blaze Data Services (BlazeDS)

BlazeDS is a server-based Java remoting and web messaging technology that enables developers to connect to back-end distributed data and push data in real time to applications (based, for example, on ADOBE FLEX and ADOBE AIR technologies) for responsive, rich Internet applications. BlazeDS is available from Adobe Systems Incorporated, 345 Park Avenue, San Jose, Calif. 95110-2704, for free under the Adobe license.

In this exemplary embodiment, a BlazeDS server consumes JMS messages produced by the system's back office 340. BlazeDS then interprets the JMS messages and composes AMP Flex messages relevant to connected RCSAs. In the present system, it is installed and runs on the same servlet container as the system's back office 340, though other embodiments will use different architectures and deployment schemes. Custom software pieces implemented using the BlazeDS plug-in infrastructure and API, and remote objects that utilize the back office web services, are configured in the standard BlazeDS configuration files, which are source-controlled and deployed along with any deployments of the RCSA code base. Sun's implementation of JMS, Sun's Java Message System ("MQ" or "OpenMQ"), is one suitable transport and broker for JMS messaging from back office 340. Back office managers based on existing back office architecture manage web sessions, including JMS message delivery, persistence and session maintenance, as will occur to those skilled in this technology area.

13.2 RCSA Adobe Flex-Based GUI

The RCSA in this embodiment consumes and produces asynchronous Flex messages generated by and for the BlazeDS instance onto streaming HTTPS channels. In one embodiment, one channel is for inbound messages that originated as back office JMS messages, while another channel is for outbound messages destined to be SOAP web service calls. Alternative architectures will occur to those skilled in the art based on this disclosure.

13.3 BlazeDS/RCSA Communication Details

13.3.1 Architectural Modules

Figure 9:
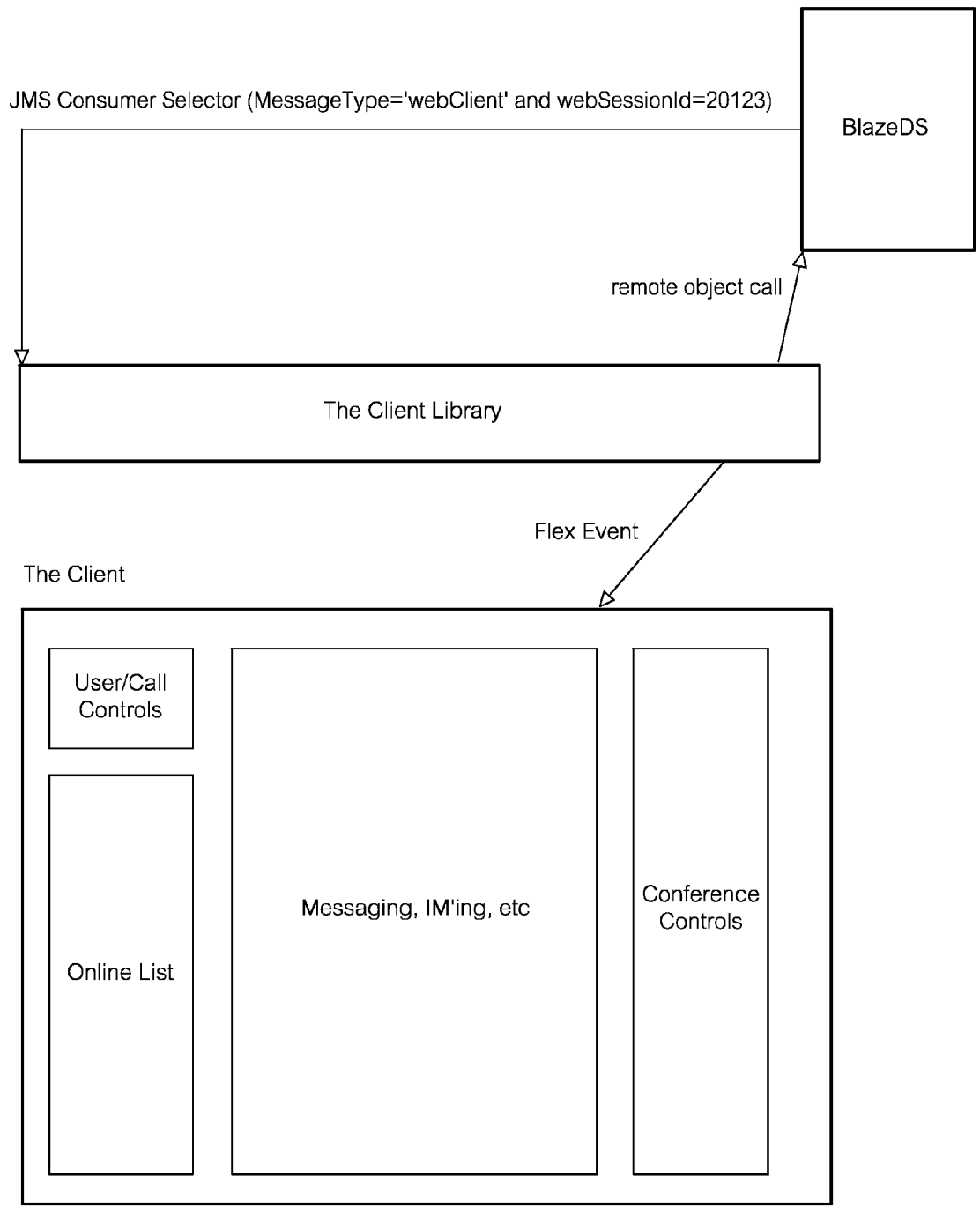
FIG. 9 is a block diagram of client-side messaging flow in the system of FIG. 3.

The modules participating in BlazeDS/RCSA communication in the present embodiment are illustrated in FIG. 9.

13.3.2 Back Office Web Session Routing Mechanisms

In this exemplary embodiment, the Back Office Routing Mechanisms are a set of Java classes responsible for routing JMS messages through the back office server instance using JMS selectors. A RCSA instance will only consume messages addressed with its session identification. The routing mechanisms include a manager instance for every connected RCSA, worker instances for each message type, and actions that describe what the system's response should be to a received message. For example, a "mute my line" worker running under a manager for a given RCSA would receive a mute message, queue it, and take action that actually mutes the user's line.

13.3.2 Adobe Action Script 3 Client Library

The client library contains the necessary framework to connect to and communicate with the BlazeDS server instance with a Flex-based client. This client includes event listeners and handlers for incoming messages and then translates them into generic Flex events for the desired user interface reaction. It also contains an API for communicating through remote objects to the web services layer of the back office 340.

13.3.3 User Interface Based on Adobe Flex 3

Figure 10:
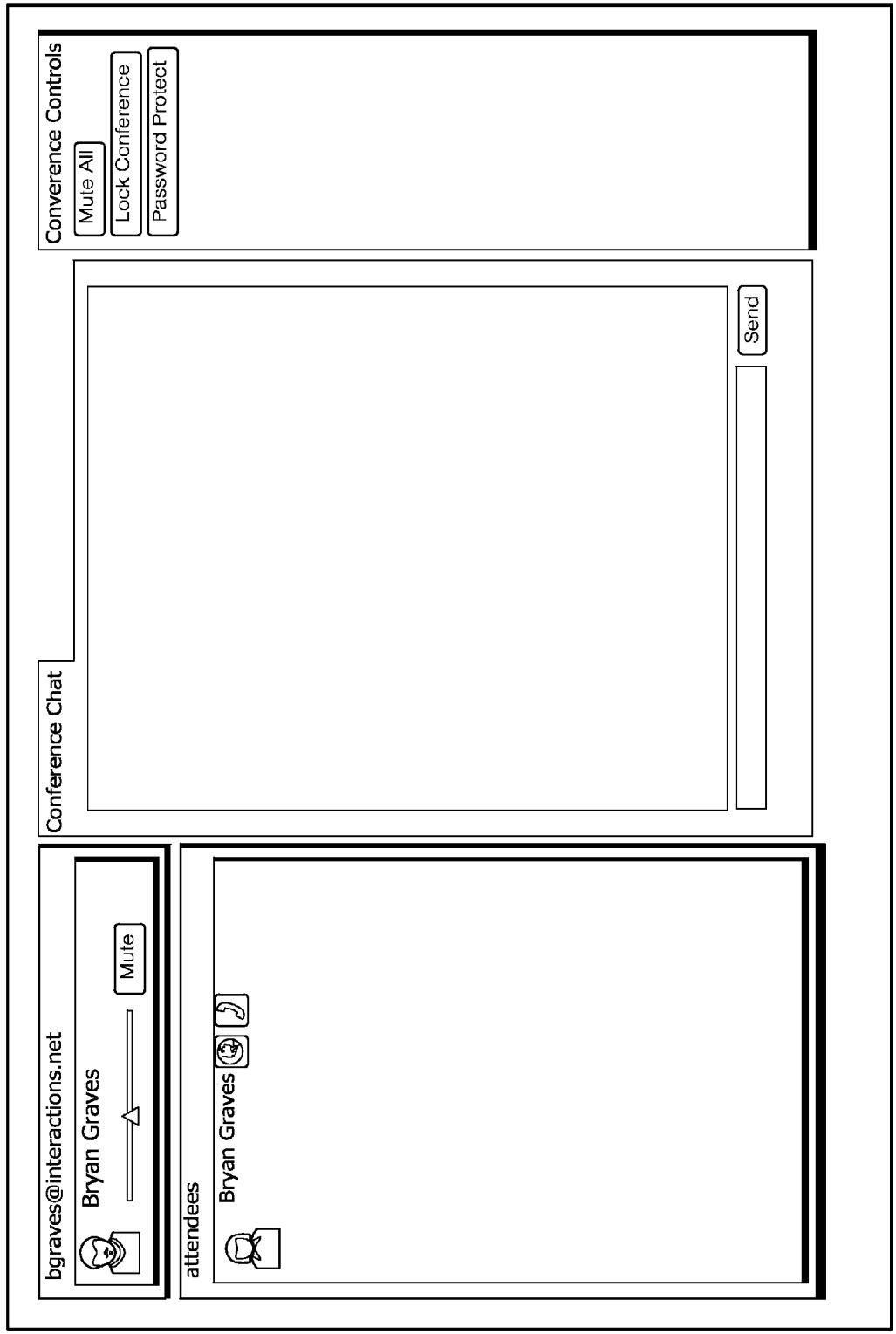
FIG. 10 is a message flow diagram for an example client of the system of FIG. 3.
Figure 11:
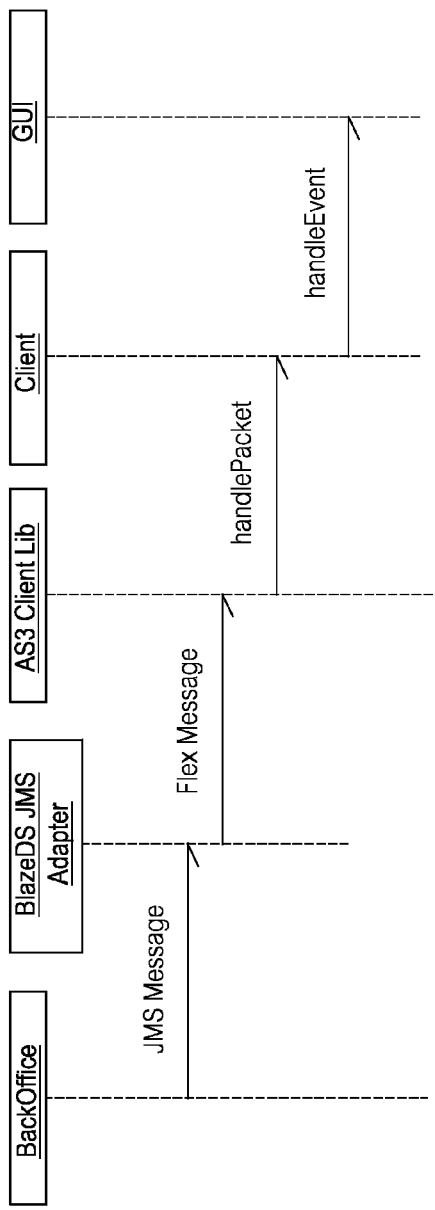
FIG. 11 is a flow diagram of messages related to the UI shown in FIG. 10.

The user interface (UI) of the RCSA consumes Flex-based events that originate in the client library and is based on the model-view-controller design pattern. Each component, including conference controls, call controls, etc., has its own corresponding controller that affects the component view upon receiving a relevant event. FIG. 10 illustrates one exemplary UI used in connection with this exemplary system. The related message flow is illustrated in FIG. 11.

13.3.3.1 Attendee List Component

The attendee list maintains a dynamic list of conference attendees and their presence type (phone and/or web).

13.3.3.2 User/Call Component

The user component displays who you are and your call's controls, if you are on the phone, including mute and volume control.

13.3.3.3 Conference Control Component

Conference controls are typically only available to conference leaders, and in this embodiment include controls to mute all lines, lock a conference, and protect a conference with a passcode.

13.3.3.4 Message Controls

Message controls are text-based communication, or instant messaging, between conference attendees at both an individual and conference level.

14 Architectural Integration

14.1 Incoming Sequence

Message flow and call sequence for an incoming message are illustrated in FIG. 11.

14.2 Outgoing Sequence

Figure 12:
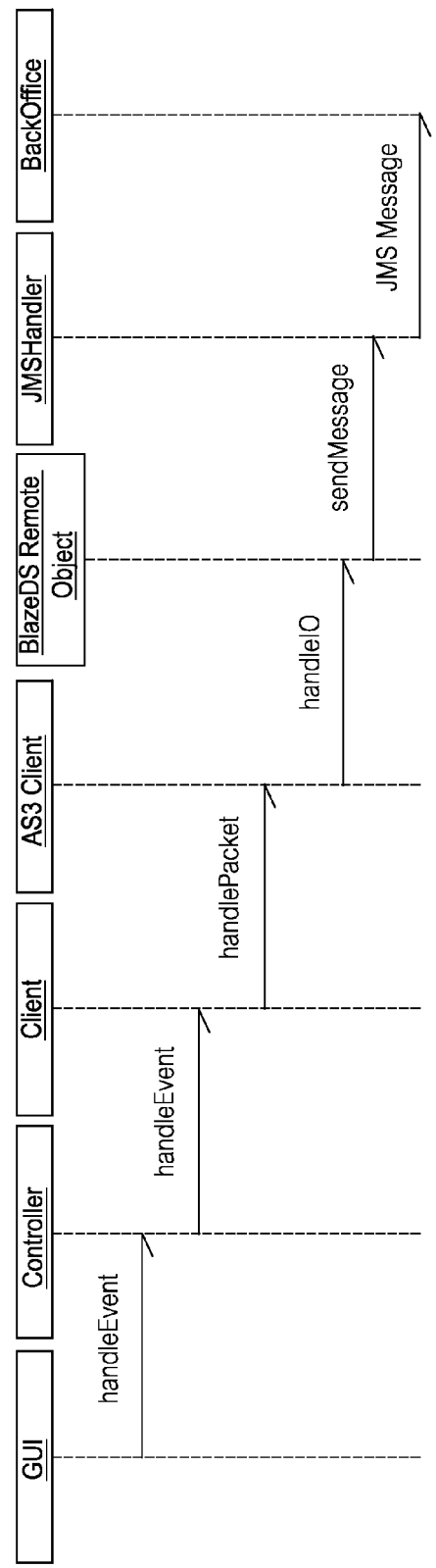
FIG. 12 is a second flow diagram of messages related to the UI shown in FIG. 10.

Message flow and call sequence for an outgoing message are illustrated in FIG. 12.

While many aspects of this novel system have been illustrated and described in detail in the drawings and foregoing description, the same is to be considered as illustrative and not restrictive in character. An embodiment has been shown and described, but changes and modifications will occur to those skilled in the art based on this disclosure, and these may still be protected.

What is claimed is:

1. A system, comprising a processor and a memory in communication with the processor, the memory storing programming instructions executable by the processor to:
   enter a virtual assistant mode responsive to receipt of DTMF input from the line of a participant in a conference call;
   thereafter mute audio from the line of the participant to the conference call and reduce a volume level of audio from the conference call to the line of the participant;
   play spoken input from the participant in a manner perceivable by a first intent analyst in the virtual assistant mode;
   accept input from the first intent analyst that indicates the first intent analyst's interpretation of a system request in the spoken input;
   provide feedback concerning receipt of the system request to the participant; and
   automatically execute the system request responsively to the accepting function;
   wherein the programming instructions are further executable by the processor to:
   substantially simultaneously with the playing to the first intent analyst, play the spoken input in a manner perceivable by a second intent analyst;
   accept input from the second intent analyst that indicates the second intent analyst's interpretation of the system request;
   the executing operation is a function of the input accepted from both the first and the second intent analysts;
   wherein the programming instructions are further executable by the processor, if the first intent analyst's interpretation and the second intent analyst's interpretation are different, to:
   play the spoken input in a manner perceivable by a third intent analyst,
   accept input from the third intent analyst that indicates the third intent analyst's interpretation of the system request; and
   use the input from the third intent analyst as a tiebreaker between the input from the first intent analyst and the second intent analyst.

2. The system of claim 1, wherein the system request is in the set of requests consisting of:
   muting the line of the of the participant to the conference call;
   beginning to transcribe speech in the conference call;
   suspending transcription of speech in the conference call;
   listing participants in the conference call; and
   initiating an outgoing call to attempt to join another person to the conference call.

3. The system of claim 1, wherein the feedback concerning receipt of the system request is audio feedback.

4. The system of claim 1, wherein the feedback is prerecorded audio.

* * * * *